United States Patent
Park et al.

(10) Patent No.: US 11,487,377 B2
(45) Date of Patent: Nov. 1, 2022

(54) ELECTRONIC DEVICE ACQUIRING USER INPUT WHEN IN SUBMERGED STATE BY USING PRESSURE SENSOR, AND METHOD FOR CONTROLLING ELECTRONIC DEVICE

(71) Applicant: Samsung Electronics Co., Ltd., Suwon-si (KR)

(72) Inventors: Junghoon Park, Suwon-si (KR); Hyunseok Kim, Suwon-si (KR); Dongyup Lee, Suwon-si (KR); Yongseung Yi, Suwon-si (KR); Hoyeong Lim, Suwon-si (KR); Seunggoo Kang, Suwon-si (KR); Dongil Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/968,728

(22) PCT Filed: Feb. 14, 2019

(86) PCT No.: PCT/KR2019/001813
§ 371 (c)(1),
(2) Date: Aug. 10, 2020

(87) PCT Pub. No.: WO2019/160348
PCT Pub. Date: Aug. 22, 2019

(65) Prior Publication Data
US 2021/0004114 A1    Jan. 7, 2021

(30) Foreign Application Priority Data
Feb. 14, 2018    (KR) ........................ 10-2018-0018147

(51) Int. Cl.
*G06F 3/041*    (2006.01)
*G06F 3/044*    (2006.01)
(Continued)

(52) U.S. Cl.
CPC .......... *G06F 3/0414* (2013.01); *G06F 3/0445* (2019.05); *G06F 3/04883* (2013.01);
(Continued)

(58) Field of Classification Search
None
See application file for complete search history.

(56) References Cited

U.S. PATENT DOCUMENTS

| 9,323,382 B2 | 4/2016 | Sugiura |
| 9,606,681 B2 | 3/2017 | Rodzevski et al. |

(Continued)

FOREIGN PATENT DOCUMENTS

| EP | 2821897 A1 | 1/2015 |
| JP | 2012-027701 A | 2/2012 |

(Continued)

OTHER PUBLICATIONS

European Search Report dated Nov. 5, 2020, issued in European Patent Application No. 19754681.5-1231.

(Continued)

*Primary Examiner* — Christopher R Lamb
(74) *Attorney, Agent, or Firm* — Jefferson IP Law, LLP

(57) ABSTRACT

According to various embodiments, disclosed is an electronic device comprising at least one sensor, a display comprising a touch panel, at least one pressure sensor disposed in the upper or lower layer of the touch panel such that pressure applied to at least a part of a region of the display can be sensed, and at least one processor, the at least one processor configured to: sense whether the electronic device is in a submerged state by using the at least one sensor or the display, receive a user input with respect to the at least a part of a region of the display while the electronic device is sensed to be in the submerged state, acquire the pressure and the position of the user input by using the at (Continued)

least one pressure sensor, and process the user input on the basis of the acquired pressure and the acquired position.

8 Claims, 14 Drawing Sheets

(51) Int. Cl.
  *G06F 3/04883* (2022.01)
  *G06F 3/04886* (2022.01)
  *H04M 1/18* (2006.01)

(52) U.S. Cl.
  CPC ............... *G06F 3/04886* (2013.01); *G06F 2203/04106* (2013.01); *H04M 1/18* (2013.01)

(56) References Cited

U.S. PATENT DOCUMENTS

| | | | |
|---|---|---|---|
| 9,860,844 B2 | 1/2018 | Yang et al. | |
| 10,503,330 B2 | 12/2019 | Lee et al. | |
| 2009/0049404 A1* | 2/2009 | Jung | G06F 3/0416 715/810 |
| 2010/0099394 A1* | 4/2010 | Hainzl | H04W 52/027 455/418 |
| 2012/0023450 A1 | 1/2012 | Noto et al. | |
| 2014/0071084 A1 | 3/2014 | Sugiura | |
| 2015/0009173 A1 | 1/2015 | Rodzevski et al. | |
| 2015/0070179 A1 | 3/2015 | Wu et al. | |
| 2016/0092025 A1* | 3/2016 | Wu | G06F 3/04186 345/173 |
| 2017/0003879 A1* | 1/2017 | Tamai | G06F 3/0227 |
| 2017/0265141 A1 | 9/2017 | Yang et al. | |
| 2017/0344155 A1 | 11/2017 | Lee et al. | |
| 2017/0351850 A1 | 12/2017 | Jin et al. | |
| 2018/0039368 A1 | 2/2018 | Choi et al. | |
| 2018/0039392 A1 | 2/2018 | Kim et al. | |
| 2018/0067614 A1* | 3/2018 | Hong | G06F 3/0447 |
| 2018/0188874 A1* | 7/2018 | Cho | G01L 1/205 |
| 2019/0278416 A1* | 9/2019 | Lee | G06F 3/0416 |

FOREIGN PATENT DOCUMENTS

| | | | | |
|---|---|---|---|---|
| JP | 2013-186501 A | 9/2013 | | |
| JP | 2014-056421 A | 3/2014 | | |
| KR | 10-2009-0017818 A | 2/2009 | | |
| KR | 10-2015-0009963 A | 1/2015 | | |
| KR | 10-2017-0077856 A | 7/2017 | | |
| KR | 10-2017-0135562 A | 12/2017 | | |
| KR | 10-2017-0136359 A | 12/2017 | | |
| KR | 10-2018-0015352 A | 2/2018 | | |
| KR | 10-2018-0015478 A | 2/2018 | | |
| WO | WO-2016204568 A1 * | 12/2016 | ........... | G06F 3/0488 |
| WO | WO-2018016924 A1 * | 1/2018 | ............. | G06F 3/041 |

OTHER PUBLICATIONS

Korean Office Action dated Mar. 4, 2022, issued in Korean Patent Application No. 10-2018-0018147.

* cited by examiner

ELECTRONIC DEVICE ACQUIRING USER INPUT WHEN IN SUBMERGED STATE BY USING PRESSURE SENSOR, AND METHOD FOR CONTROLLING ELECTRONIC DEVICE

TECHNICAL FIELD

Embodiments disclosed in the disclosure relate to an electronic device for acquiring a user input using a pressure sensor in a submerged state, and a method for controlling the electronic device.

BACKGROUND ART

With a development of an information technology (IT), various types of electronic devices, such as a smartphone, a tablet personal computer (PC, and the like, have been widely used.

The electronic devices may utilize a user's touch as an input through a display containing a touch panel. For example, when the user touches a specific position of the display, the electronic device may activate an interface displayed at the position or execute an application corresponding to the position in response to the touch.

In one example, recently, electronic devices to which a waterproof or dustproof function is applied have appeared. Through the waterproof or dustproof function, the electronic device may provide a wider use environment to the user.

DISCLOSURE

Technical Problem

When an electronic device operates in a submerged state, control of the electronic device through a touch panel may be limited. An electronic device including a capacitive touch panel may receive a user input by sensing a change in a capacitance resulted from a user's touch. When the electronic device is in the submerged state, because moisture is a substance that conducts electricity, the change in the capacitance may be sensed at any position of a display in contact with the moisture. In this case, it may be difficult for the electronic device to distinguish the change in a capacitance resulted from the user's touch and the change in the capacitance resulted from the moisture. That is, it may be difficult for the electronic device in the submerged state to accurately sense a position actually touched by the user through the touch panel.

As described above, because of not being able to accurately acquire a user input, it may be difficult for the electronic device to provide various operations corresponding to the user input.

Embodiments disclosed in the disclosure are intended to provide an electronic device for solving the above-mentioned problems and the problems disclosed in the disclosure.

Technical Solution

An aspect of the disclosure provides an electronic device including at least one sensor, a display including a touch panel, at least one pressure sensor disposed on an upper layer or a lower layer of the touch panel so as to sense a pressure applied to at least a region of the display, and at least one processor, wherein the at least one processor may sense whether the electronic device is in a submerged state using the at least one sensor or the display, receive a user input to the at least a region of the display while the electronic device is sensed in the submerged state, acquire a pressure and a position of the user input using the at least one pressure sensor, and process the user input based on the acquired pressure and the acquired position.

Another aspect of the disclosure provides an electronic device including at least one sensor, a first pressure sensor disposed to correspond to a first pressure region of a display, at least one second pressure sensor disposed to correspond to a second pressure region of the display, and a processor, wherein the processor may display a first user interface using the first pressure region and the second pressure region, determine whether the electronic device satisfies a specified condition using the at least one sensor, and display a second user interface in the first pressure region and display a third user interface in the second pressure region when the electronic device satisfies the specified condition.

Another aspect of the disclosure provides a method for controlling an electronic device in a submerged state including sensing whether the electronic device is in the submerged state, receiving a user input to at least a region of a display while the electronic device is sensed in the submerged state, acquiring a pressure and a position of the user input using at least one pressure sensor, and processing the user input based on the acquired pressure and the acquired position.

Advantageous Effects

According to embodiments disclosed in the disclosure, the electronic device may sense the position at which the user's input is made even in the submerged state, and perform a specified operation in response to the input. Because the user may use various functions through the electronic device even in the submerged state, usability of the electronic device may be extended. In addition, various effects that are directly or indirectly identified through the disclosure may be provided.

DESCRIPTION OF DRAWINGS

In connection with a description of the drawings, the same or similar reference numerals may be used for the same or similar components.

MODE FOR INVENTION

Figure 1:
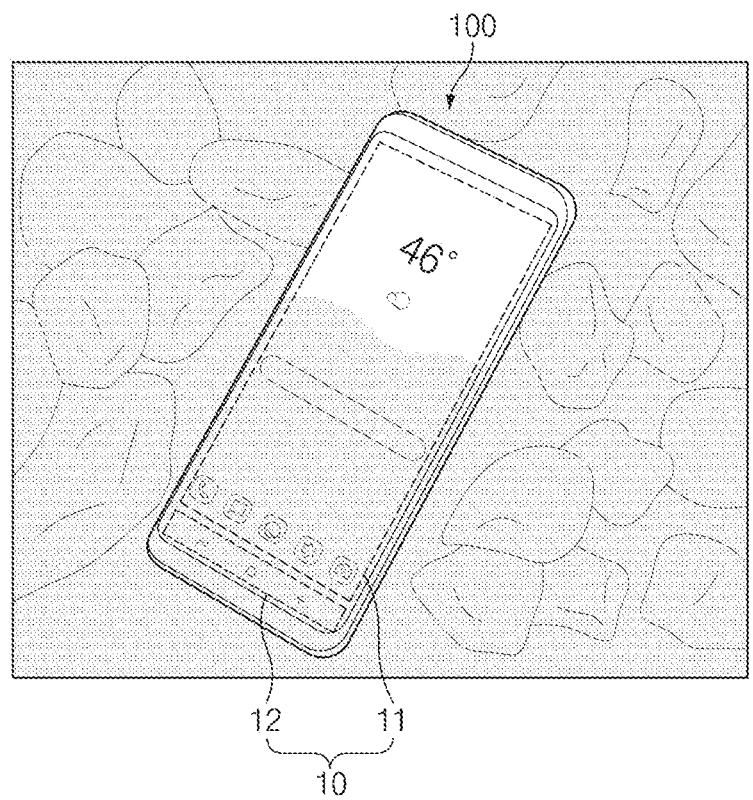
FIG. 1 illustrates an electronic device operating in a submerged state, according to one embodiment.

FIG. 1 illustrates an electronic device operating in a submerged state, according to one embodiment.

Referring to FIG. 1, at least a portion of an electronic device 100 may be in a submerged state. According to an embodiment, the electronic device 100 may operate normally even underwater by preventing moisture particles from permeating the electronic device 100. For example, the electronic device 100 may play a specified audio or image even when the at least a portion thereof is in the submerged state, and may perform wireless communication or cellular communication with another electronic device 100.

According to an embodiment, the electronic device 100 may include a display. The display may be exposed through one surface of the electronic device 100. According to an embodiment, the display may include a touch panel, and when the electronic device 100 is not in the submerged state, may acquire a user input by the touch panel. For example, when the electronic device 100 is not in the submerged state, and when a user touches a specific position of the display, a capacitance recognized by a touch sensor of the electronic device may change based on the position touched by the user. The electronic device 100 may acquire the position touched by the user as an input through the change in the capacitance.

According to an embodiment, when the electronic device 100 is in the submerged state, the electronic device 100 may prevent the touch panel from acquiring the user input. For example, when the electronic device 100 is in the submerged state, it may be difficult for the touch panel to sense the change in the capacitance resulted from the user's touch because of moisture particles. Therefore, when the electronic device 100 is in the submerged state, the electronic device 100 may deactivate the touch panel such that the touch panel does not acquire the user input.

According to an embodiment, the electronic device 100 may include at least one pressure sensor disposed on an upper or lower layer of the touch panel. In an embodiment, the at least one pressure sensor may sense a pressure applied to at least a region of the display. Because the pressure applied to the at least a region of the display may be sensed regardless of the moisture particles, the at least one pressure sensor may acquire a pressure of the user input regardless of whether the electronic device 100 is in the submerged state.

According to an embodiment, a region 10 of the display may include a first region 11 and a second region 12. The first region 11 may be, for example, a region in which the touch panel is disposed and the pressure sensor is not disposed. The second region 12 may be, for example, a region in which the touch panel and the pressure sensor are all arranged.

According to an embodiment, when the electronic device 100 is not in the submerged state unlike that illustrated in FIG. 1, the touch panel may acquire user inputs made in the first region 11 and the second region 12, and the pressure sensor may acquire the user input made in the second region 12.

According to an embodiment, when the electronic device 100 is in the submerged state as illustrated in FIG. 1, the user input may be acquired only in the second region 12 by the pressure sensor. For example, while the electronic device 100 is being sensed in the submerged state, the user input to the first region 11 may be ignored.

According to an embodiment, a position or an area of the second region 12 is not limited to that illustrated in FIG. 1. The second region 12 illustrated in FIG. 1 is only one embodiment, and the position and the area of the second region 12 may be variously set. For example, the second region 12 may be formed at an upper or a side surface of the electronic device 100 differently as illustrated in FIG. 1, and may be extended to a front face of the electronic device 100.

Figure 2:
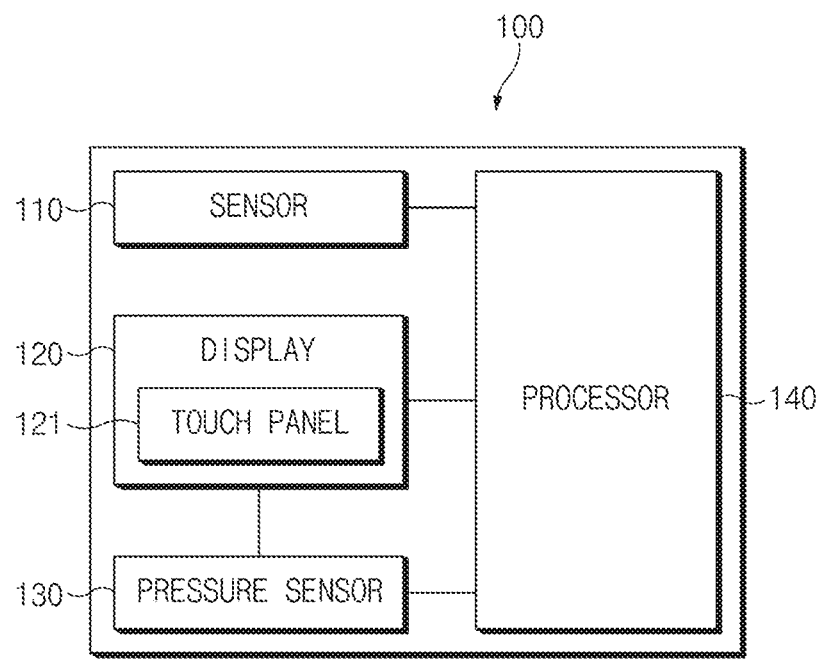
FIG. 2 illustrates a block diagram of an electronic device, according to one embodiment.

FIG. 2 illustrates a block diagram of an electronic device, according to one embodiment.

Referring to FIG. 2, the electronic device 100 may include a sensor 110, a display 120, a pressure sensor 130, and a processor 140. According to various embodiments, the electronic device 100 may omit some of the components illustrated in FIG. 2, and may further include components not illustrated in FIG. 2. For example, the electronic device 100 may further include a memory for storing instructions executed by the processor 140.

According to an embodiment, the sensor 110 may be a sensor sensing whether the electronic device 100 is in the submerged state. According to an embodiment, the sensor 110 may include a liquid sensing sensor or a water pressure sensing sensor. According to an embodiment, the liquid sensing sensor may determine whether the electronic device 100 is in the submerged state by sensing an amount of light reflected by moisture, and the water pressure sensing sensor may determine whether the electronic device 100 is in the submerged state through a pressure applied to an exterior of the electronic device 100. In an embodiment, the sensor 110 may transmit a sensing result to the processor 140.

The display 120 may output at least one content or item (e.g., a text, an image, a video, an icon, a widget, a symbol, or the like). The display 120 may include, for example, a liquid crystal display (LCD), a light emitting diode (LED) display, an organic light emitting diode (OLED) display, a micro electromechanical system (MEMS) display, or an electronic paper display.

According to an embodiment, the display 120 may output a specified user experience (UX) based on an environment of the electronic device 100 and provide the specified user experience to the user. For example, the electronic device 100 may display a first UX while not being sensed in the submerged state and may display a second UX distinct from the first UX while being sensed in the submerged state. In the present specification, the UX may mean one screen or a series of screens displayed to provide the user with an experience of using the electronic device.

According to an embodiment, because manipulation of the electronic device 100 may be limited in the submerged state, the second UX may be a simple and simplified design compared to the first UX. For example, execution icons represented in the second UX may be larger in size than execution icons represented in the first UX, and a spacing between the execution icons in the second UX may be set larger than a spacing in the first UX.

According to an embodiment, the display 120 may include a touch panel (or a touch sensor) 121 or be integrally implemented with the touch panel 121. In this case, the display 120 may also be referred to as a touch screen panel (TSP) or a touch screen display panel.

According to an embodiment, the touch panel 121 may sense the position of the user input while the electronic device 100 is not sensed in the submerged state. For example, the touch panel 121 may sense the position of the user input based on the change in the capacitance occurring at the position where the user input is made. The touch panel 121 may transmit the sensing result to the processor 140.

According to an embodiment, the touch panel 121 may not sense the position of the user input while the electronic device 100 is sensed in the submerged state. It may be difficult for the touch panel 121 to distinguish the change in the capacitance resulted from the user input and a change in a capacitance resulted from the moisture while the electronic device 100 is sensed in the submerged state. Therefore, when the electronic device 100 is sensed in the submerged state, the touch panel 121 may not sense the position of the user input.

According to an embodiment, the display 120 may sense whether the electronic device 100 is in the submerged state through the touch panel 121. When a conductive material is in contact with a surface of the display 120, the touch panel 121 may sense a change in a capacitance generated by the conductive material. In an embodiment, when the electronic device 100 is in the submerged state, the change in the capacitance may be sensed in an entire region in contact with the moisture particles. Accordingly, when the change of the capacitance is sensed in a wide area of the region of the display 120, it may be determined that the electronic device 100 is in the submerged state.

The pressure sensor 130 may be disposed on an upper or lower layer of the touch panel 121 to sense a pressure (or a force) of an external object (e.g., a user's finger and an electronic pen) to the display 120. According to an embodiment, the pressure sensor 130 may sense a pressure applied to at least a region of the display 120. For example, the pressure sensor 130 may sense a pressure applied to the second region 12 illustrated in FIG. 1. According to an embodiment, the pressure sensor 130 may sense the pressure applied to the at least a region of the display 120 regardless of whether the electronic device 100 is sensed in the submerged state.

According to an embodiment, the pressure sensor 130 may include a plurality of pressure sensors. For example, the pressure sensor 130 may include a first pressure sensor and a second pressure sensor. In an embodiment, the first pressure sensor may sense only a pressure applied to a region where the first pressure sensor is placed, and the second pressure sensor may sense only a pressure applied to a region where the second pressure sensor is placed.

According to an embodiment, the pressure sensor 130 may sense the position as well as the pressure of the user input while the electronic device 100 is sensed in the submerged state. For example, the pressure sensor 130 may sense the position where the user input occurs based on which of the plurality of pressure sensors 130 sensed a pressure of a specified intensity while the electronic device 100 is being sensed in the submerged state.

According to an embodiment, the pressure sensor 130 may not sense the position of the user input while the electronic device 100 is not sensed in the submerged state. When the electronic device 100 is not in the submerged state, because the touch panel 121 senses the position of the user input, the pressure sensor 130 may sense only the pressure of the user input and not the position of the user input.

The processor 140 may be electrically connected to the components included in the electronic device 100, and may execute operations or data processing related to control and/or communication of the components included in the electronic device 100. For example, the processor 140 may receive sensed results from the sensor 110, the touch panel 121, and/or the pressure sensor 130 and perform a specified operation based on the received results. In another example, the processor 140 may transmit image data to the display 120 (or a display driving circuit) such that the display 120 outputs a specified screen based on a specified event.

According to an embodiment, when determining that the electronic device 100 is not in the submerged state through the sensor 110 or the display 120, the processor 140 may acquire the position of the user input through the touch panel 121 and acquire the pressure of the user input through the pressure sensor 130.

According to an embodiment, when determining that the electronic device 100 is in the submerged state through the sensor 110 or the display 120, the processor 140 acquire the position and the pressure of the user input through the pressure sensor 130. In other words, while the electronic device 100 is sensed in the submerged state, the processor 140 may determine the position of the user input not based on the result sensed by the touch panel 121, but based on the result sensed by the pressure sensor 130. In an embodiment, the processor 140 may deactivate the touch panel 121 while the electronic device 100 is sensed in the submerged state.

According to an embodiment, the processor 140 may determine whether an intensity of the pressure of the user input acquired from the pressure sensor 130 is greater than the specified intensity. For example, the processor 140 may ignore the user input when the acquired pressure intensity is less than the specified intensity. In another example, the processor 140 may process the user input based on the acquired pressure and the acquired position of the user input when the acquired pressure intensity is greater than the specified intensity.

According to an embodiment, the processor 140 may set the specified intensity differently based on whether the electronic device 100 is sensed in the submerged state. For example, the processor 140 may process the user input when the intensity of the pressure of the user input is greater than a first intensity when the electronic device 100 is sensed in the submerged state, and may process the user input when the intensity of the pressure of the user input is greater than a second intensity when the electronic device 100 is not sensed in the submerged state. In an embodiment, when the electronic device 100 is sensed in the submerged state, the position of the user input is acquired through the pressure sensor 130, so that the first intensity may be set greater than the second intensity to increase an accuracy of the user input.

According to an embodiment, the processor 140 may transmit specified image data such that different UXs are displayed on the display 120 based on whether the electronic device 100 is sensed in the submerged state. For example, when the electronic device 100 is sensed in the submerged state, the processor 140 may transmit the specified image data such that a more simplified UX is displayed on the display 120.

Figure 3:
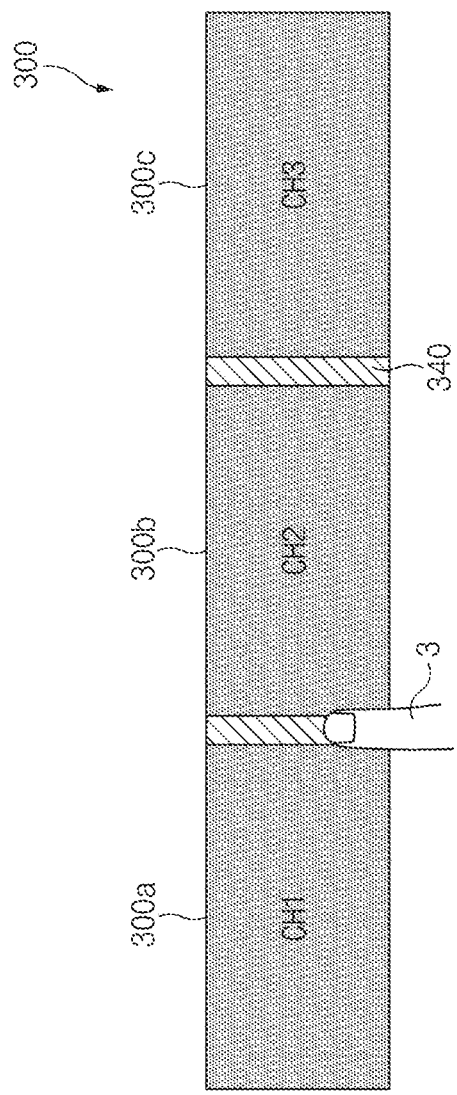
FIG. 3 illustrates a top view of at least one pressure sensor included in an electronic device, according to one embodiment.
Figure 4:
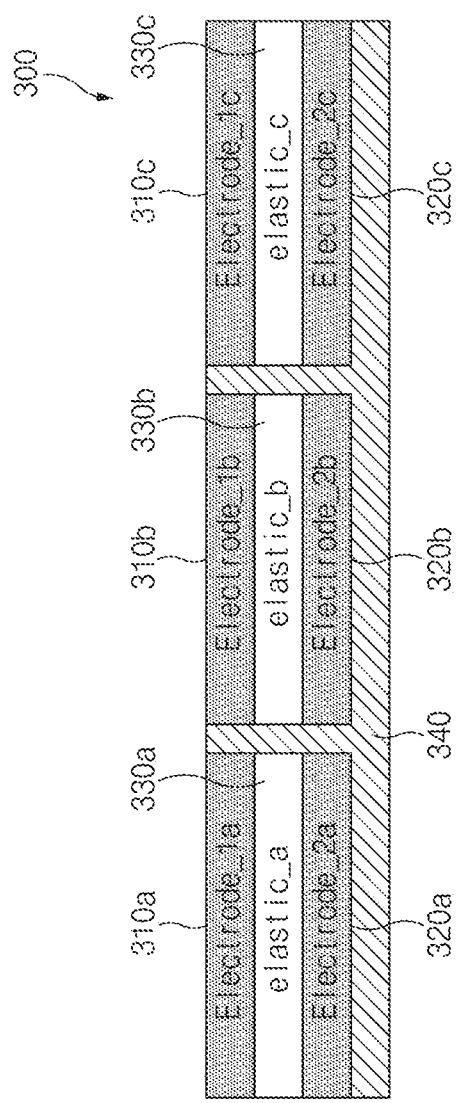
FIG. 4 illustrates a side view of at least one pressure sensor included in an electronic device, according to one embodiment.
Figure 5:
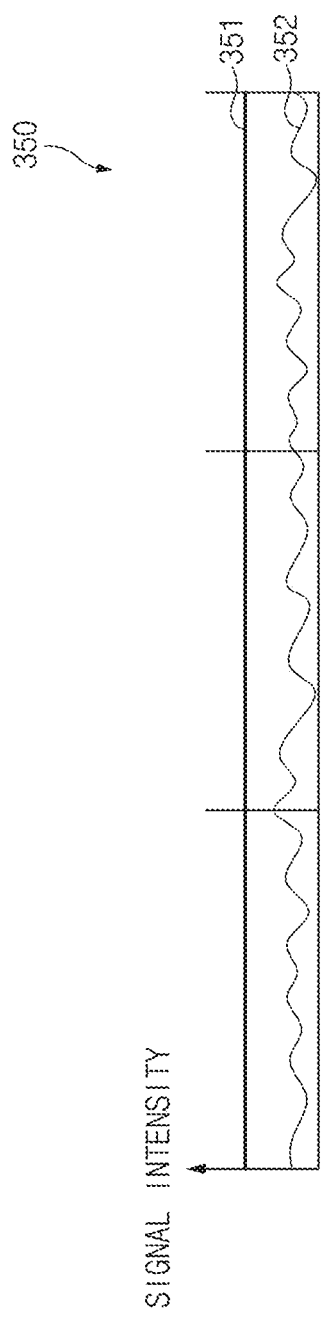
FIG. 5 is a graph showing a sensitivity of at least one pressure sensor included in an electronic device, according to one embodiment.

FIG. 3 illustrates a top view of at least one pressure sensor included in an electronic device, according to one embodiment. In addition, FIG. 4 illustrates a side view of at least one pressure sensor included in an electronic device, according to one embodiment. In addition, FIG. 5 is a graph showing a sensitivity of at least one pressure sensor included in an electronic device, according to one embodiment.

Referring to FIGS. 3 and 4, a pressure sensor 300 included in the electronic device 100 may include a plurality of pressure sensors. For example, the pressure sensor 300 may include a first pressure sensor 300a, a second pressure sensor 300b, and a third pressure sensor 300c. In the disclosure, the first pressure sensor 300a, the second pressure sensor 300b, and the third pressure sensor 300c may be referred to as the first channel 300a, the second channel 300b, and the third channel 300c, respectively.

According to an embodiment, the pressure sensor 300 may include first electrode layers 310a, 310b, and 310c, second electrode layers 320a, 320b, and 320c, and elastic body layers 330a, 330b, and 330c. The elastic body layers 330a, 330b, and 330c may be respectively arranged between the first electrode layers 310a, 310b, and 310c and the second electrode layers 320a, 320b, and 320c, and may act as a buffer against a pressure applied from the outside. In an embodiment, the first electrode layers 310a, 310b, and 310c, the second electrode layers 320a, 320b, and 320c, and the elastic body layers 330a, 330b, and 330c may be respectively parallel to each other.

According to an embodiment, the pressure sensor 300 may sense a pressure of a user input 3 based on capacitances respectively between the first electrode layers 310a, 310b, and 310c and the second electrode layers 320a, 320b, and 320c, which are changed by the pressure applied from the outside. When a pressure having an intensity greater than the specified intensity is applied to at least some channels, for example, the first channel 300a, of the pressure sensor 300, a distance between the first electrode 310a and the second electrode 320a may decrease. In this case, a capacitance between the first electrode 310a and the second electrode 320a is inversely proportional to the distance between the electrodes, so that the capacitance may be increased. The electronic device 100 may sense that the pressure is generated from the outside based on the change in the capacitance at the first channel 300a.

According to an embodiment, the first channel 300a, the second channel 300b, and the third channel 300c may be arranged to be spaced apart from each other by a specified distance to accurately sense a position of the user input 3.

For example, when the user input 3 is made at a position of the first channel 300a adjacent to the second channel 300b, and when the first channel 300a and the second channel 300b are not separated from each other unlike as shown in FIG. 3, the first electrode 310b of the second channel 300b may be pressed together when the first electrode 310a of the first channel 300a is pressed. However, as shown in FIG. 3, when the first channel 300a and the second channel 300b are spaced apart from each other, even when the first electrode 310a of the first channel 300a is pressed, the first electrode 310b of the second channel 300b may be prevented from being pressed together. Accordingly, the electronic device 100 may accurately sense the position as well as the pressure of the user input 3 using the pressure sensor 300 while being sensed in the submerged state.

According to an embodiment, each support 340 for dividing the channels may be included between two adjacent channels of the pressure sensor 300. The support 340 may allow the user input 3 to be accurately input to one channel rather than a boundary between the two adjacent channels.

For example, as shown in FIG. 3, when the user input 3 is made on a boundary between the first channel 300a and the second channel 300b, the support 340 may prevent the first electrode 310a of the first channel 300a and the first electrode 310b of the second channel 300b from being pressed. In this case, because the user input 3 may not be sensed at any of the first channel 300a and the second channel 300b, the user may provide the user input 3 again in a region corresponding to the first channel 300a or a region corresponding to the second channel 300b.

Referring to a first graph 350 shown in FIG. 5, it may be seen that, when the user input 3 is made at the boundary between the first channel 300a and the second channel 300b, a signal 352 applied to the pressure sensor 300 as the user input 3 is measured smaller than a threshold value 351 at both the first channel 300a and the second channel 300b.

Through the structure shown in FIGS. 3 and 4, the pressure sensor 300 may recognize the user input 3 only when the user input 3 is accurately input to one channel, and the pressure sensor 300 may accurately sense the position as well as the pressure of the user input 3 while the electronic device 100 is being sensed in the submerged state.

Figure 6:
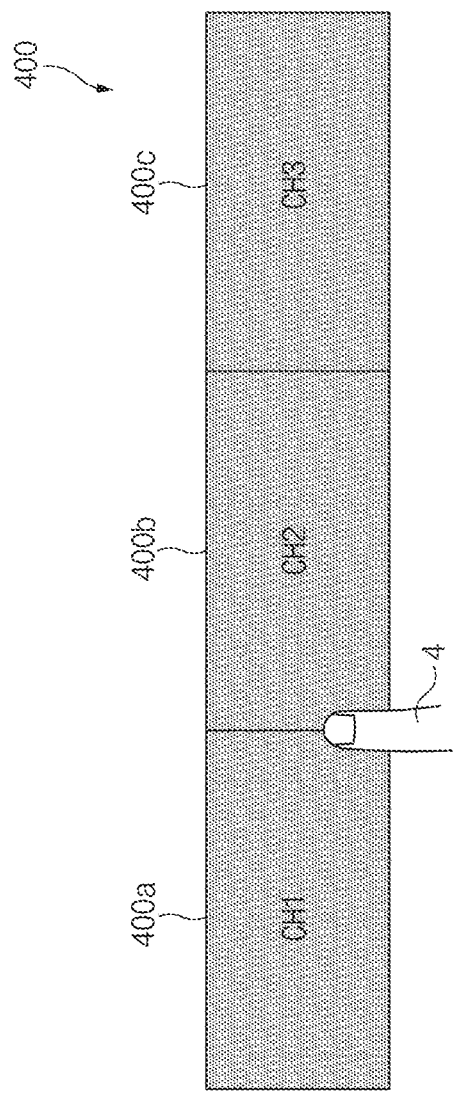
FIG. 6 illustrates a plan view of at least one pressure sensor included in an electronic device, according to another embodiment.
Figure 7:
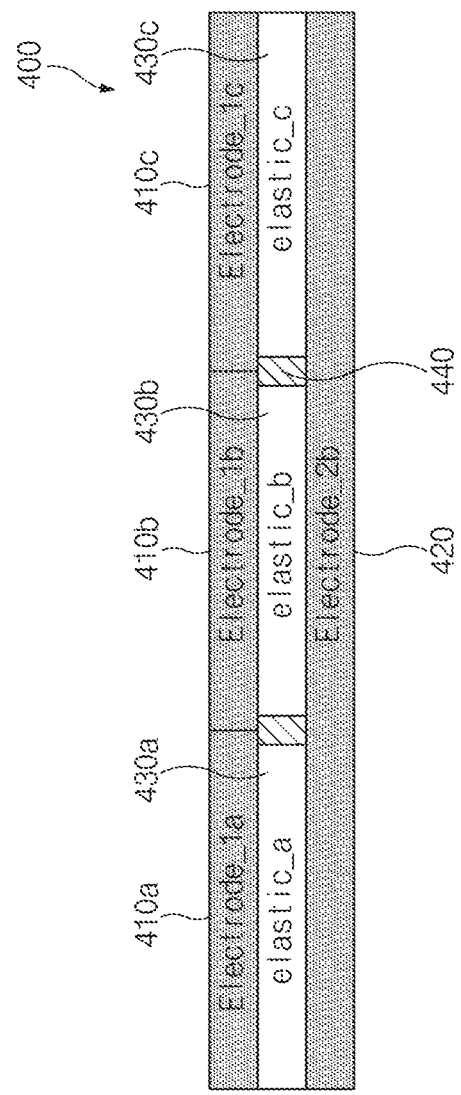
FIG. 7 illustrates a side view of at least one pressure sensor included in an electronic device, according to another embodiment.
Figure 8:
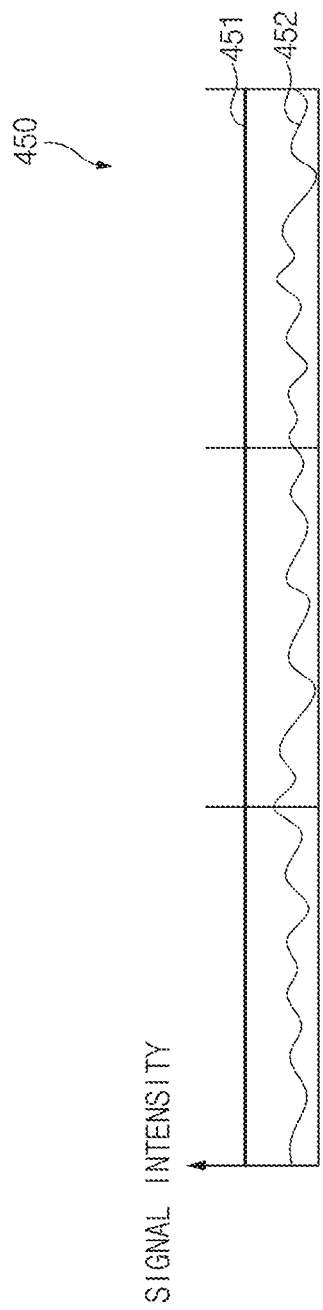
FIG. 8 is a graph showing a sensitivity of at least one pressure sensor included in an electronic device, according to another embodiment.

FIG. 6 illustrates a plan view of at least one pressure sensor included in an electronic device, according to another embodiment. In addition, FIG. 7 illustrates a side view of at least one pressure sensor included in an electronic device, according to another embodiment. In addition, FIG. 8 is a graph showing a sensitivity of at least one pressure sensor included in an electronic device, according to another embodiment.

Referring to FIGS. 6 and 7, a pressure sensor 400 included in the electronic device 100 may include a plurality of pressure sensors. For example, the pressure sensor 400 may include a first pressure sensor 400a, a second pressure sensor 400b, and a third pressure sensor 400c. In the disclosure, the first pressure sensor 400a, the second pressure sensor 400b, and the third pressure sensor 400c may be respectively referred to as the first channel 400a, the second channel 400b, and the third channel 400c. In a description of FIGS. 6 to 8, a content overlapping with the description of FIGS. 3 to 5 may be omitted.

According to an embodiment, as shown in FIGS. 6 and 7, the pressure sensor 400 including the plurality of channels 400a, 400b, and 400c may include first electrodes 410a, 410b, and 410c that are separated from and in contact with each other, elastic bodies 430a, 430b, and 430c that are separated from and in contact with each other, and a second electrode 420 that is formed integrally.

According to an embodiment, when the first electrodes 410a, 410b, and 410c of the respective channels 400a, 400b, and 400c are separated from each other even though the first electrodes 410a, 410b, and 410c are not spaced apart from each other, a neighboring channel may not be affected even when a user input 4 is applied to one channel. For example, when the user input 4 is made in a region of the first channel 400a adjacent to the second channel 400b, even when the first electrode 410a of the first channel 400a is pressed, the first electrode 410b of the second channel 400b may not be pressed. Accordingly, the electronic device 100 may accurately sense a position as well as a pressure of the user input 4 using the pressure sensor 400 while being sensed in the submerged state.

According to an embodiment, the elastic bodies 430a, 430b, and 430c of the respective channels 400a, 400b, and 400c may be separated and spaced apart from each other.

When the elastic bodies 430a, 430b, and 430c of the respective channels 400a, 400b, and 400c are not separated and not spaced apart from each other, elastic bodies of neighboring channels may be affected by the user input 4. Thus, as the elastic bodies 430a, 430b, and 430c of the respective channels are separated and spaced apart from each other, the pressure sensor 400 may accurately sense the position as well as the pressure of the user input 4 while the electronic device 100 is sensed in the submerged state According to an embodiment, each support 440 may be disposed between two adjacent elastic bodies of the elastic bodies 430a, 430b, and 430c of the respective channels. The support 440 may allow the user input 4 to be accurately input to one channel, not a boundary between two adjacent channels of the channels 400a, 400b, and 400c.

For example, as shown in FIG. 6, when the user input 4 is made at a boundary between the first channel and the second channel, the support 440 may prevent the first electrode 410a of the first channel 400a and the first electrode 410b of the second channel 400b from being pressed. In this case, the user input 4 may not be sensed at any of the first channel 400a and the second channel 400b, and the user may provide the user input 4 again in a region corresponding to the first channel 400a or a region corresponding to the second channel 400b.

Referring to a first graph 450 shown in FIG. 8, it may be seen that, when the user input 4 is made at the boundary between the first channel 400a and the second channel 400b, a signal 452 applied to the pressure sensor 400 as the user input 4 is measured to be smaller than a threshold value 451 at both the first channel 400a and the second channel 400b.

According to an embodiment, because the second electrode 420 of the respective channels 400a, 400b, and 400c is not pressed by the user input 4, the second electrode 420 may be integrally formed as one electrode at all the channels as shown in FIG. 7.

Through the structure shown in FIGS. 6 and 7, the pressure sensor 400 may recognize the user input 4 only when the user input 4 is accurately input to one channel, and the pressure sensor 400 may accurately sense the position as well as the pressure of the user input 4 while the electronic device 100 is sensed in the submerged state.

Figure 9:
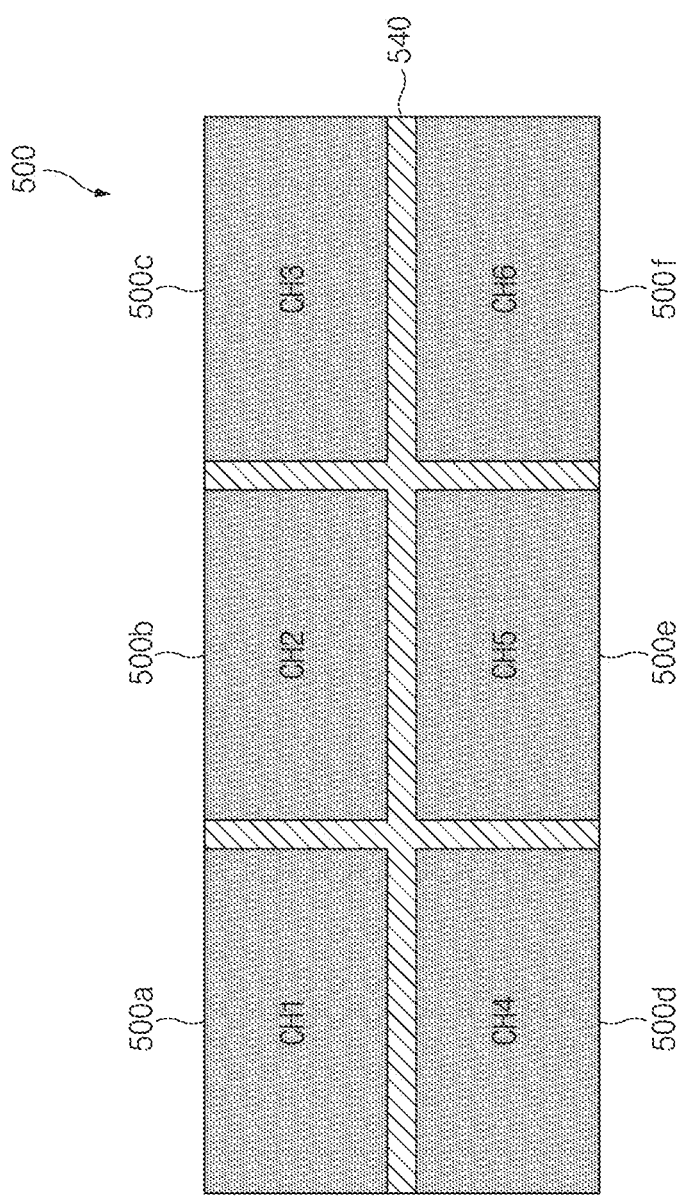
FIG. 9 illustrates a plan view of at least one pressure sensor included in an electronic device, according to another embodiment.

FIG. 9 illustrates a plan view of at least one pressure sensor included in an electronic device, according to another embodiment.

Referring to FIG. 9, a pressure sensor 500 included in the electronic device 100 may not be limited to have channels arranged in one row as shown in FIG. 3 or 4, but may have channels arranged in a plurality of rows. According to various embodiments, the pressure sensor 500 may not be limited to that shown in FIG. 9 and may include a larger number of channels, and the channels may be arranged in a larger number of rows. For example, the pressure sensor 500 may be disposed over a front surface of the electronic device 100.

According to an embodiment, even when the channels of the pressure sensor 500 are arranged in the plurality of rows, a structure of channels 500a, 500b, 500c, 500d, 500e, and 500f may be the same as or similar to the structures shown in FIGS. 3 and 4 or FIGS. 6 and 7. For example, as shown in FIG. 9, the channels 500a, 500b, 500c, 500d, 500e, and 500f may be separated and spaced apart from each other. In another example, unlike as shown in FIG. 9, first electrodes of the respective channels 500a, 500b, 500c, 500d, 500e, and 500f may be separated from (e.g., via supports including support 540) and in contact with each other, elastic bodies of the respective channels may be separated and spaced apart from each other, and a second electrode of the respective channels may be integrally formed as one electrode.

Accordingly, the pressure sensor 500 may recognize, only when a user input is accurately input to one channel, the user input, and the pressure sensor 500 may sense a position as well as a pressure of the user input while the electronic device 100 is sensed in the submerged state.

Figure 10:
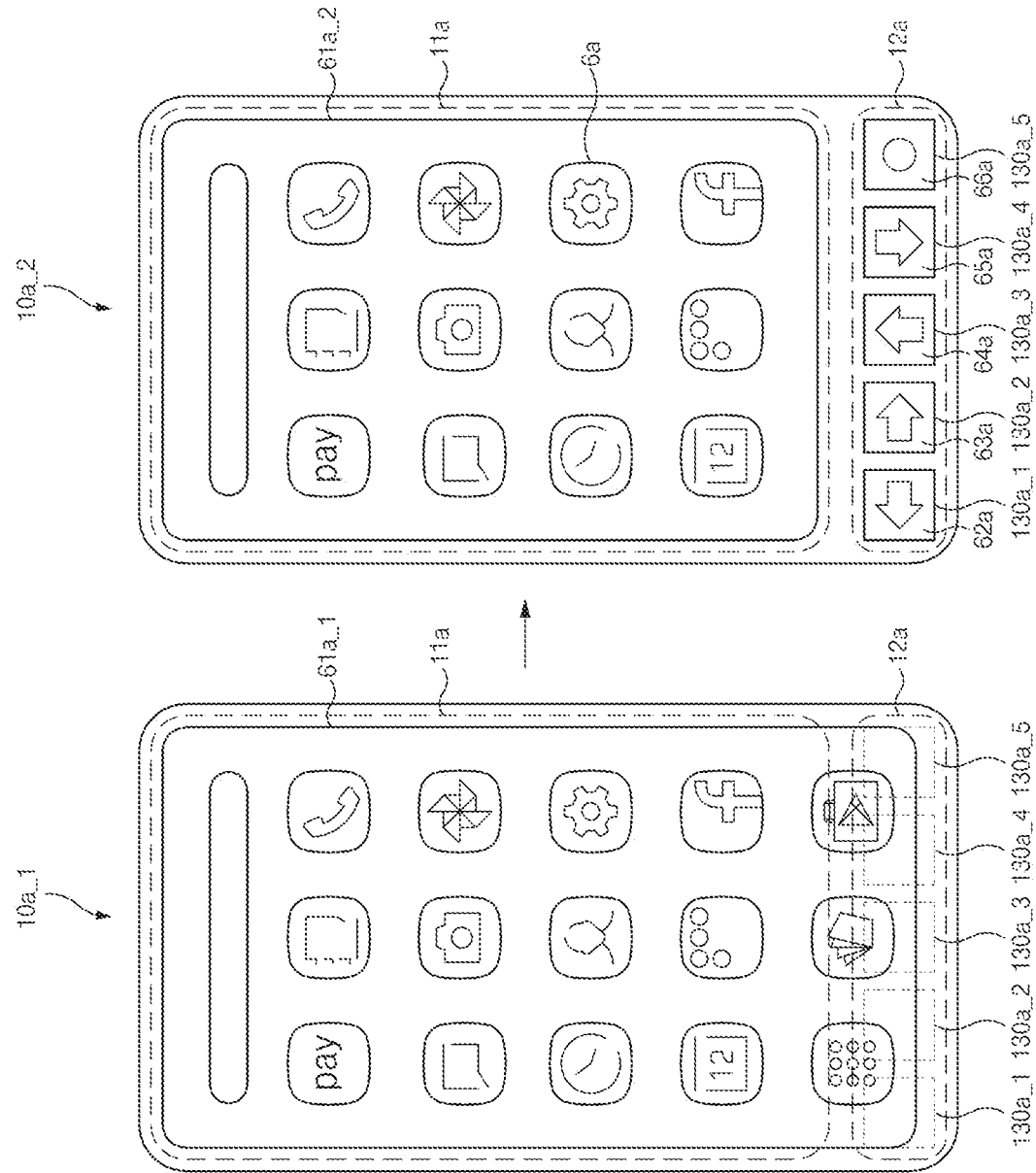
FIG. 10 illustrates a display screen that changes when an electronic device is sensed in a submerged state, according to one embodiment.

FIG. 10 illustrates a display screen that changes when an electronic device is sensed in a submerged state, according to one embodiment.

Referring to FIG. 10, the electronic device 100 may output a UX, which is distinguished from a UX in the case where the electronic device 100 is not sensed in the submerged state, while the electronic device 100 is sensed in the submerged state. For example, when the electronic device 100 is not sensed in the submerged state, a display screen 10a_1 may be output, and when the electronic device 100 is sensed in the submerged state, a display screen 10a_2 may be output.

According to an embodiment, each of the display screens 10a_1 and 10a_2 of the electronic device 100 may include a first region 11a and a second region 12a. According to an embodiment, the first region 11a may be a region in which a pressure sensor is not disposed, and the second region 12a may be a region in which the pressure sensor is disposed. According to an embodiment, the second region 12a may include a plurality of pressure regions. For example, the second region 12a may include a first pressure region 130a_1 in which a first pressure sensor is disposed, a second pressure region 130a_2 in which a second pressure sensor is disposed, and third to fifth pressure regions 130a_3, 130a_4, and 130a_5 in which third to fifth pressure sensors are respectively arranged.

According to an embodiment, when the electronic device 100 is not sensed in the submerged state, the electronic device 100 may use at least some of the first to fifth pressure regions 130a_1, 130a_2, 130a_3, 130a_4, and 130a_5 to display a first interface 61a_1. The first interface 61a_1 may be displayed over the first region 11a and the second region 12a. In this specification, the 'interface' may mean a user interface displayed to interact with the user.

According to an embodiment, while the electronic device 100 is sensed in the submerged state, a user input to the first region 11a may be ignored. For example, the user input may be sensed only in the second region 12a where the pressure sensor is disposed. When the user input is received in the second region 12a, the electronic device 100 may acquire a position and a pressure of the user input using the pressure sensor.

According to an embodiment, while the electronic device 100 is sensed in the submerged state, an execution screen of an application may be output in the first region 11a. In an embodiment, when the electronic device 100 is in the submerged state, a field of view of the user may be limited. In this case, the execution screen may be in a more simplified form compared to that in the case where the electronic device 100 is not sensed in the submerged state.

According to an embodiment, while the electronic device 100 is sensed in the submerged state, the electronic device 100 may output at least one pointer 6a in the first region 11a (e.g., via interface 61a 2). In an embodiment, the pointer 6a may be a cursor indicating selection of a specific application as illustrated in FIG. 10. In another embodiment, the pointer 6a may be in a form of an arrow indicating a specific position unlike as shown in FIG. 10. For example, the arrow shape may be understood as the same as or similar to a mouse cursor appearing in a computer screen.

According to an embodiment, while the electronic device 100 is sensed in the submerged state, a plurality of interfaces 62a, 63a, 64a, 65a, and 66a capable of controlling the pointer 6a are output in the second region 12a. In an embodiment, each of the plurality of interfaces 62a, 63a, 64a, 65a, and 66a may be output corresponding to a position where each pressure sensor is disposed. For example, the second interface 62a may be output in the first pressure region 130a_1, and the third interface 63a may be output in the second pressure region 130a_2. A fourth interface 64a to a sixth interface 66a may be respectively output in the third pressure region to the fifth pressure region 130a_3, 130a_4, and 130a_5.

According to an embodiment, while the electronic device 100 is sensed in the submerged state, the electronic device 100 may receive the user input. According to various embodiments, when the position of the user input corresponds to the first pressure sensor, the pointer 6a is moved to a left direction, and when the position of the user input corresponds to the second pressure sensor, the pointer 6a is moved to a right direction. Further, when the position of the user input corresponds to the third pressure sensor, the pointer 6a is moved to an upward direction, and when the position of the user input corresponds to the fourth pressure sensor, the pointer 6a is moved to a downward direction. In an embodiment, when the position of the user input corresponds to the fifth pressure sensor, the electronic device 100 may execute an application corresponding to the pointer 6a.

Through the above process, the electronic device 100 may acquire the position of the user input through the pressure sensor while the electronic device 100 is sensed in the submerged state, and may perform various functions based on the user input.

Figure 11:
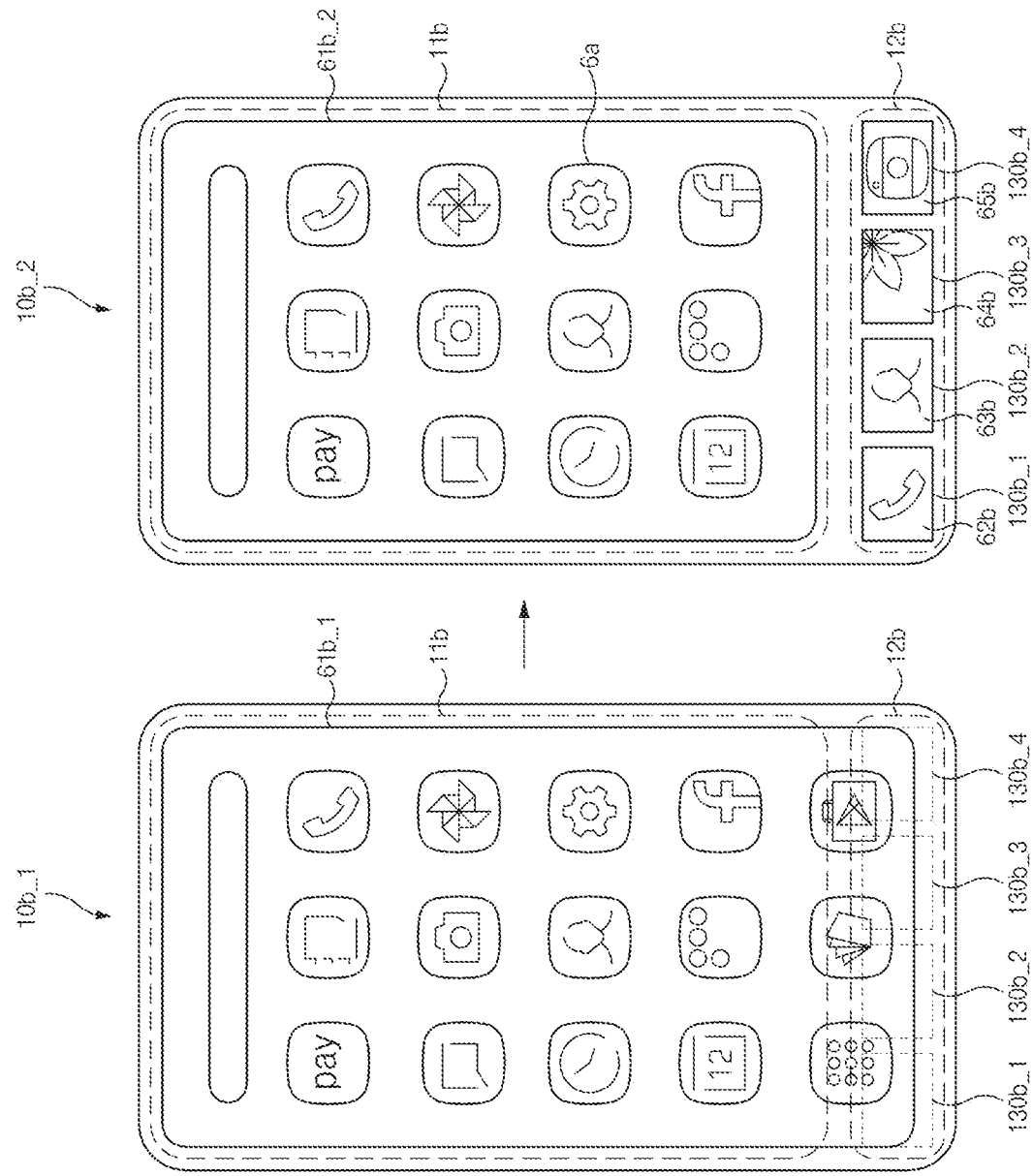
FIG. 11 illustrates a display screen that changes when an electronic device is sensed in a submerged state, according to another embodiment.

FIG. 11 illustrates a display screen that changes when an electronic device is sensed in a submerged state, according to another embodiment.

Referring to FIG. 11, the electronic device 100 may output a UX that is distinguished from a UX in the case where the electronic device 100 is not sensed in the submerged state while the electronic device 100 is sensed in the submerged state. For example, when the electronic device 100 is not sensed in the submerged state, a display screen 10b_1 may be output (e.g., including interface 61b_1), and when the electronic device 100 is sensed in the submerged state, a display screen 10b_2 may be output (e.g., including interface 61b_2). In a description of FIG. 11, a content overlapping with the description of FIG. 10 may be omitted.

According to an embodiment, while the electronic device 100 is sensed in the submerged state, an execution screen of an application may be output in a first region 11b. In an embodiment, when the electronic device 100 is in the submerged state, the field of view of the user may be limited. In this case, the execution screen may be in a more simplified form compared to that in the case where the electronic device 100 is not sensed in the submerged state.

According to an embodiment, a plurality of interfaces 62b, 63b, 64b, and 65b may be output in a second region 12b while the electronic device 100 is sensed in the submerged state. According to an embodiment, the plurality of interfaces 62b, 63b, 64b, and 65b may be execution icons for execution of specified applications and the interfaces may correspond to pressure regions 130b_1, 130b_2, 130b_3, and 130b_4. For example, the second interface 62b may be an execution icon for executing a telephone application, and the third interface 63b may be an execution icon for executing an address book application. In another example, the fourth interface 64b may be an execution icon of an application for identifying an image file, and the fifth interface 65b may be an execution icon for executing a camera application.

According to various embodiments, the plurality of interfaces 62b, 63b, 64b, and 65b are not limited to those shown in FIG. 11. For example, the user may arbitrarily set execution icons constituting the plurality of interfaces 62b, 63b, 64b, and 65b in advance.

According to an embodiment, while the electronic device 100 is sensed in the submerged state, the electronic device 100 may receive a user input. In an embodiment, when the electronic device 100 receives the user input, the electronic device 100 may acquire a position where the user input is made through the pressure sensor. The electronic device 100 may determine that user input is made at an interface corresponding to the position and execute an application corresponding to the interface.

Through the above process, the electronic device 100 may acquire the position of the user input through the pressure sensor while the electronic device 100 is sensed in the submerged state, and may perform various functions based on the user input.

Figure 12:
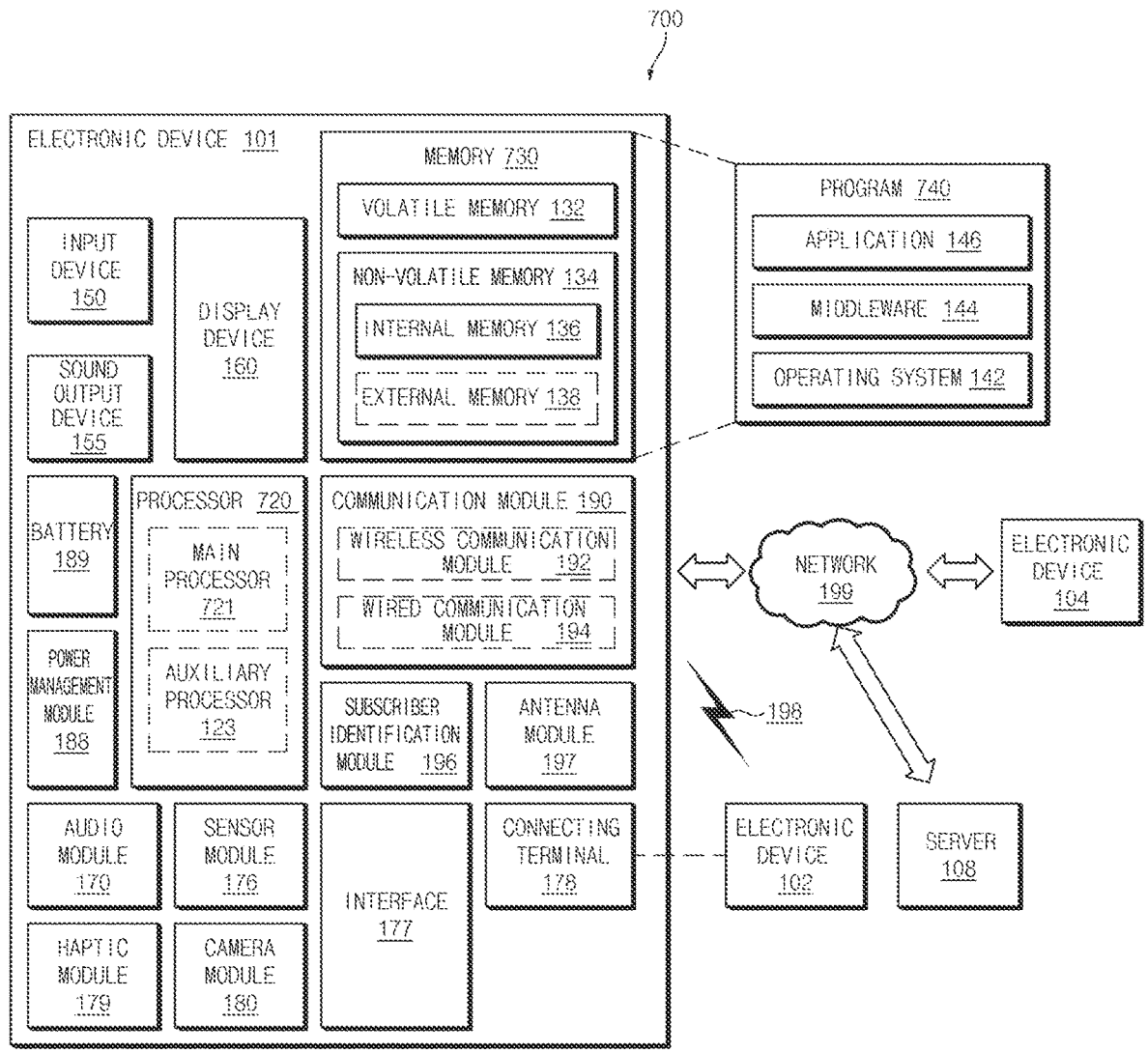
FIG. 12 is a block diagram of an electronic device in a network environment, according to various embodiments.

FIG. 12 is a block diagram illustrating an electronic device 101 in a network environment 700 according to various embodiments. Referring to FIG. 12, the electronic device 101 in the network environment 700 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 720, memory 730, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 720 may execute, for example, software (e.g., a program 740) to control at least one other component (e.g., a hardware or software component) of the electronic device 101 coupled with the processor 720, and may perform various data processing or computation. According to one embodiment, as at least part of the data processing or computation, the processor 720 may load a command or data received from another component (e.g., the sensor module 176 or the communication module 190) in volatile memory 132, process the command or the data stored in the volatile memory 132, and store resulting data in non-volatile memory 134. According to an embodiment, the processor 720 may include a main processor 721 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 123 may be adapted to consume less power than the main processor 721, or to be specific to a specified function. The auxiliary processor 123 may be implemented as separate from, or as part of the main processor 721.

The auxiliary processor 123 may control at least some of functions or states related to at least one component (e.g., the display device 160, the sensor module 176, or the communication module 190) among the components of the electronic device 101, instead of the main processor 721 while the main processor 721 is in an inactive (e.g., sleep) state, or together with the main processor 721 while the main processor 721 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 730 may store various data used by at least one component (e.g., the processor 720 or the sensor module 176) of the electronic device 101. The various data may include, for example, software (e.g., the program 740) and input data or output data for a command related thereto. The memory 730 may include the volatile memory 132 or the non-volatile memory 134.

The program 740 may be stored in the memory 730 as software, and may include, for example, an operating system (OS) 142, middleware 144, or an application 146.

The input device 150 may receive a command or data to be used by another component (e.g., the processor 720) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may acquire the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wieldy) or wirelessly. According to an embodiment, the interface 177 may include, for example, a high definition multimedia interface (HDMI), a universal serial bus (USB interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC.

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 720 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC module). A corresponding one of these communication modules may communicate with the external electronic device via the first network 198 (e.g., a short-range communication network, such as Bluetooth™ wireless-fidelity (Wi-Fi) direct, or infrared data association (IrDA) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, when the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 13:
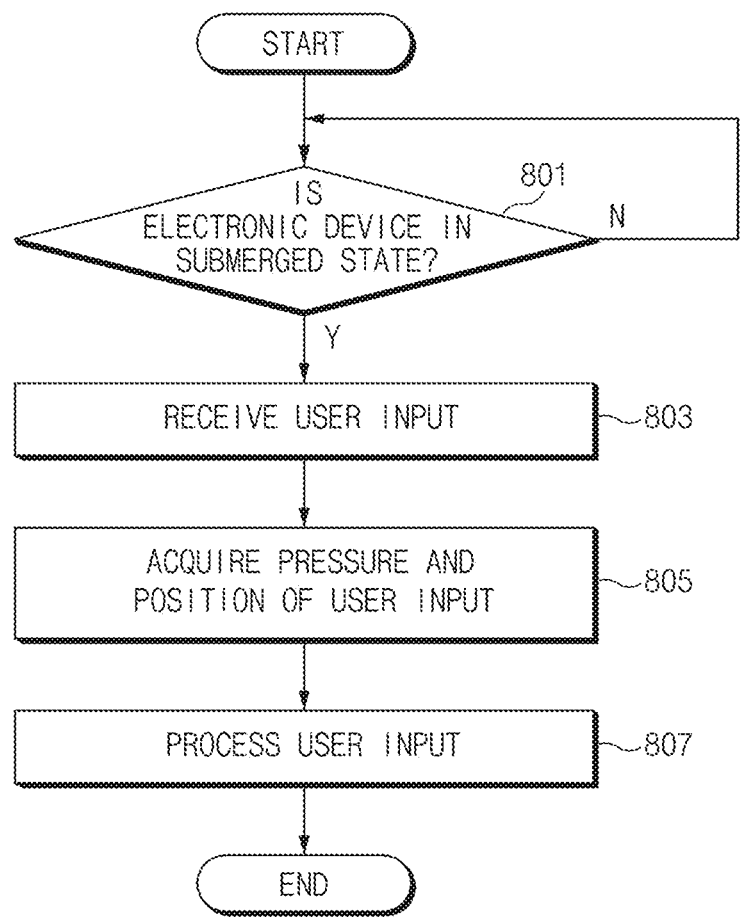
FIG. 13 is a flowchart illustrating a method, by an electronic device, for acquiring a user input using a pressure sensor in a submerged state, according to one embodiment.

FIG. 13 is a flowchart illustrating a method, by an electronic device, for acquiring a user input using a pressure sensor in a submerged state, according to one embodiment.

Referring to FIG. 13, a method for acquiring, by an electronic device (e.g., the electronic device 100 in FIG. 2), a user input using a pressure sensor in a submerged state may include operations 801 to 807. Operation 801 to operation 807 may be understood as operations by the electronic device or a processor (e.g., the processor 140 in FIG. 2).

In operation 801, the electronic device may determine whether being in the submerged state. For example, the electronic device may determine whether the electronic device is in the submerged state using at least one sensor, for example, a touch sensor. The electronic device may perform operation 803 when it is determined that the electronic device is in the submerged state, and may repeat operation 801 when it is determined that the electronic device is not in the submerged state.

In operation 803, the electronic device may receive the user input using the pressure sensor in the submerged state. According to an embodiment, the user input may have a pressure having an intensity greater than a specified intensity.

In operation 805, the electronic device may acquire the pressure and a position of the user input. According to an embodiment, the pressure and the position of the user input may be acquired by at least one pressure sensor.

In operation 807, the electronic device may process the user input based on the acquired pressure and the acquired position. For example, the electronic device may move a cursor displayed on a display based on the user input. In another example, the electronic device may execute a specified application based on the user input.

According to an embodiment, the electronic device may determine whether the acquired pressure and the acquired position respectively satisfy specified conditions. For example, the electronic device may determine whether the acquired pressure has the intensity greater than the specified intensity, and determine whether the acquired position corresponds to a specified position. The electronic device may be set to perform a specified operation when the acquired pressure and the acquired position respectively satisfy the specified conditions.

Figure 14:
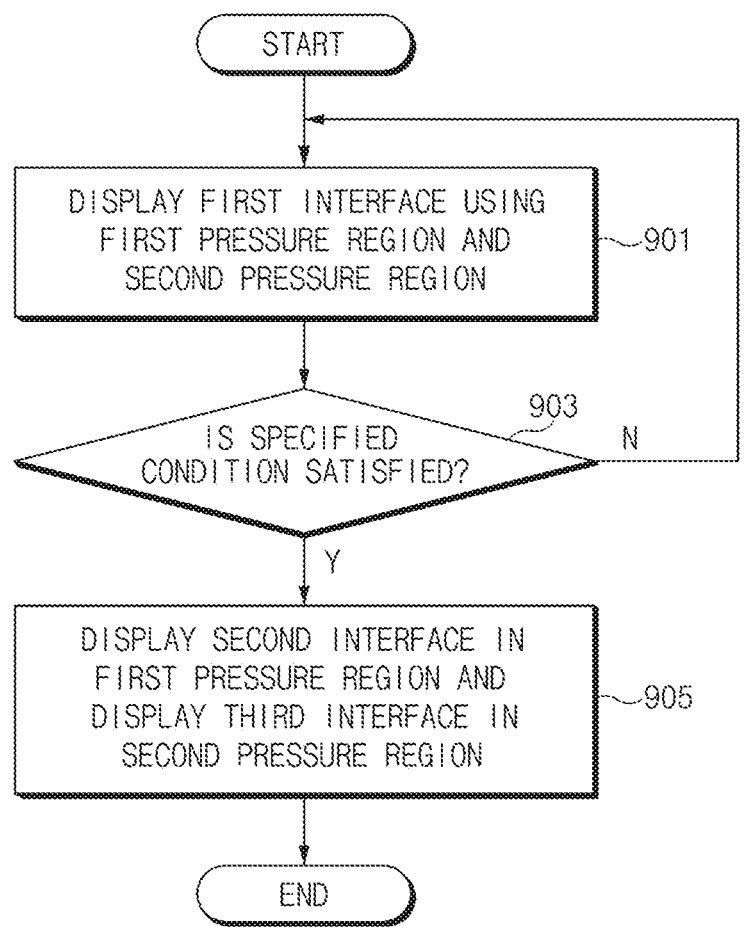
FIG. 14 is a flowchart illustrating a method for displaying different interfaces based on whether an electronic device is in a submerged state, according to one embodiment.

FIG. 14 is a flowchart illustrating a method for displaying different interfaces based on whether an electronic device is in a submerged state, according to one embodiment.

Referring to FIG. 14, a method for displaying, by an electronic device (e.g., the electronic device 100 in FIG. 2), different interfaces based on whether being in a submerged state may include operations 901 to 905. Operations 901 to 905 may be understood as operations by the electronic device or a processor (e.g., the processor 140 in FIG. 2).

In operation 901, the electronic device may display a first interface using a first pressure region and a second pressure region. According to an embodiment, operation 901 may be a case in which the electronic device is not sensed in the submerged state.

In operation 903, the electronic device may determine whether a specified condition is satisfied. The specified condition may be, for example, a condition related to whether the electronic device is in the submerged state. For example, when an external pressure of the electronic device has a level equal to or greater than a specified level, the electronic device may determine that the specified condition is satisfied. In another example, when a touch sensor sensing a change in a capacitance senses that the change in the capacitance in a wide area of a display region is the maximum (e.g., exceeding a specified change amount), the electronic device may determine that the specified condition is satisfied.

The electronic device may perform operation 905 when determining that the specified condition is satisfied, and may perform operation 901 again when determining that the specified condition is not satisfied.

In operation 905, the electronic device may display a second interface in the first pressure region and display a third interface in the second pressure region. In other words, because it is determined that the electronic device is in the submerged state, the electronic device may display an interface distinct from the first interface on the display. When the electronic device is in the submerged state, the electronic device may process the user input using a pressure sensor.

For example, the second interface for execution of a first application may be displayed in the first pressure region where a first pressure sensor is disposed, and the third interface for execution of a second application may be displayed in the second pressure region where a second pressure sensor is disposed. When the user provides a user input for the second interface, the electronic device may execute the first application, and when the user provides a user input for the third interface, the electronic device may execute the second application.

According to embodiments disclosed in the disclosure, the electronic device may sense the position at which the user input is made even in the submerged state, and perform the specified operation in response to the input. Because the user may use the various functions through the electronic device even in the submerged state, usability of the electronic device may be extended.

An electronic device (e.g., the electronic device 100 in FIG. 1) according to an embodiment disclosed in the disclosure may include at least one sensor (e.g., the sensor 110 in FIG. 2), a display (e.g., the display 120 in FIG. 2) including a touch panel (e.g., the touch panel 121 in FIG. 2), at least one pressure sensor (e.g., the pressure sensor 130 in FIG. 2) disposed on an upper layer or a lower layer of the touch panel so as to sense a pressure applied to at least a region of the display, and at least one processor (the processor 140 in FIG. 2), wherein the processor may sense whether the electronic device is in a submerged state using the at least one sensor or the display, receive a user input to the at least a region of the display while the electronic device is sensed in the submerged state, acquire a pressure and a position of the user input using the at least one pressure sensor, and process the user input based on the acquired pressure and the acquired position.

According to an embodiment, the at least one processor may control the touch panel to refrain the touch panel from acquiring the position of the user input while the electronic device is sensed in the submerged state.

According to an embodiment, the at least one processor may ignore a user input to a region other than the at least a region of the display while the electronic device is sensed in the submerged state.

According to an embodiment, the at least one processor may display a first user experience (UX) on the display while the electronic device is not sensed in the submerged state, and display a second UX different from the first UX on the display while the electronic device is sensed in the submerged state.

According to an embodiment, the at least one processor may process the user input based on the acquired pressure and the acquired position when an intensity of the acquired pressure is greater than a specified intensity.

According to an embodiment, the user input may correspond to a first user input, wherein the at least one processor may process the first user input when an intensity of a pressure of the first user input is greater than a first intensity, receive a second user input to the at least a region of the display while the electronic device is not sensed in the submerged state, and process the second user input when an intensity of a pressure of the second user input is greater than a second intensity, wherein the first intensity may be greater than the second intensity.

According to an embodiment, the at least one pressure sensor may include a first pressure sensor and a second pressure sensor, wherein the at least one processor may execute a first application when the position of the user input corresponds to the first pressure sensor, and execute a second application when the position of the user input corresponds to the second pressure sensor.

According to an embodiment, the at least one pressure sensor may include a first pressure sensor, a second pressure sensor, a third pressure sensor, and a fourth pressure sensor, wherein the at least one processor may output a pointer on the display while the electronic device is sensed in the submerged state, move the pointer to a left direction when the position of the user input corresponds to the first pressure sensor, move the pointer to a right direction when the position of the user input corresponds to the second pressure sensor, move the pointer to an upward direction when the position of the user input corresponds to the third pressure sensor, and move the pointer to a downward direction when the position of the user input corresponds to the fourth pressure sensor.

According to an embodiment, the at least one pressure sensor may include a first pressure sensor and a second pressure sensor, wherein the first pressure sensor and the second pressure sensor may be spaced apart from each other by a specified distance. In an embodiment, the electronic device may further include a support disposed (the support 340 in FIG. 3) disposed between the first pressure sensor and the second pressure sensor.

According to an embodiment, the at least one pressure sensor may include a first electrode layer (e.g., the first electrode layer 310a in FIG. 4), a second electrode layer (e.g., the second electrode layer 320a in FIG. 4 parallel to the first electrode layer, and an elastic body layer (e.g., the elastic body layer 330a in FIG. 4 disposed between the first electrode layer and the second electrode layer, wherein an elastic body layer of a first pressure sensor among the at least one pressure sensor and an elastic body layer of a second pressure sensor among the at least one pressure sensor may be spaced apart from each other by a specified distance. In an embodiment, the electronic device may further include a support disposed between the elastic body layer of the first pressure sensor and the elastic body layer of the second pressure sensor.

According to an embodiment, the at least one sensor may include a liquid sensing sensor or a water pressure sensing sensor.

An electronic device (e.g., the electronic device 100 in FIG. 1) according to another embodiment disclosed in the disclosure may include at least one sensor (e.g., the sensor 110 in FIG. 2), a first pressure sensor (e.g., the pressure sensor 130 in FIG. 2) disposed to correspond to a first pressure region (e.g., the first pressure region 130a_1 in FIG. 10) of a display (e.g., the display 120 in FIG. 2), and at least one second pressure sensor (e.g., the pressure sensor 130 in FIG. 2) disposed to correspond to a second pressure region (e.g., the second pressure region 130a_2 in FIG. 10) of the display, and a processor (the processor 140 in FIG. 2), wherein the processor may display a first user interface using the first pressure region and the second pressure region, determine whether the electronic device satisfies a specified condition using the at least one sensor, and display a second user interface in the first pressure region and display a third user interface in the second pressure region when the electronic device satisfies the specified condition.

According to an embodiment, the processor may determine that the specified condition is satisfied when it is determined that the electronic device is in the submerged state based at least on sensor information acquired through the at least one sensor.

According to an embodiment, the processor may acquire a user input through the first pressure sensor or the second pressure sensor when the electronic device satisfies the specified condition.

A method for controlling an electronic device in a submerged state according to an embodiment disclosed in the disclosure may include sensing whether the electronic device is in the submerged state, receiving a user input to at least a region of the display while the electronic device is sensed in the submerged state, acquiring a pressure and a position of the user input using at least one pressure sensor, and processing the user input based on the acquired pressure and the acquired position.

According to an embodiment, the method may further include controlling a touch panel to refrain the touch panel from acquiring the user input while the electronic device is sensed in the submerged state.

According to an embodiment, the method may further include ignoring a user input to a region other than the at least a region of the display while the electronic device is sensed in the submerged state.

According to an embodiment, the method may further include displaying a first user experience (UX) on the display while the electronic device is not sensed in the submerged state, and displaying a second UX different from the first UX on the display while the electronic device is sensed in the submerged state.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that when an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC.

Various embodiments as set forth herein may be implemented as software (e.g., the program 740) including one or more instructions that are stored in a storage medium (e.g., internal memory 136 or external memory 138) that is readable by a machine (e.g., the electronic device 101). For example, a processor (e.g., the processor 720) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. When distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   at least one sensor;
   a display comprising:
      a touch panel capable of obtaining a user touch input both a first region and a second region of the display, wherein the first region and the second region do not overlap each other, and two or more pressure sensors disposed on an upper layer or a lower layer of the second region to sense a pressure applied to different pressure regions of the second region, wherein the two or more pressure sensors are spaced apart from each other by a specified distance; and at least one processor, wherein the at least one processor is configured to:

sense whether the electronic device is in a submerged state using the at least one sensor or the display, in response to sensing that the electronic device is not in the submerged state:

display, on the first region and the second region, a first user interface on which icons of a plurality of applications are arranged, and in response to sensing that the electronic device is in the submerged state:

deactivate the touch panel, display, on the first region, a second user interface changed from the first user interface, wherein the second user interface includes a pointer, sizes of icons displayed on the second user interface are the same as sizes of the icons displayed on the first user interface and a distance between the icons displayed on the second user interface is the same as a distance between the icons displayed on the first user interface, display, on the pressure regions of the second region, third user interfaces, receive a user input to one pressure region of the pressure regions, and based on a function allocated to a user interface being positioned on the one pressure region of the third user interfaces, process the user input, wherein the at least one processor is further configured to, while the electronic device is sensed in the submerged state:

move the pointer in a leftward direction based on a position of the user input corresponding to a first pressure sensor of the two or more pressure sensors, move the pointer in a rightward direction based on the position of the user input corresponding to a second pressure sensor of the two or more pressure sensors, move the pointer in an upward direction based on the position of the user input corresponding to a third pressure sensor of the two or more pressure sensors, move the pointer in a downward direction based on the position of the user input corresponding to a fourth pressure sensor of the two or more pressure sensors, and execute an application of which an icon is indicated by the pointer based on the position of the user input corresponding to a fifth pressure sensor of the two or more pressure sensors.

2. The electronic device of claim 1, wherein the at least one processor is further configured to:

obtain a pressure and a position of the user input using one pressure sensor of the two or more pressure sensors, process the user input when an intensity of an acquired pressure is greater than a specified intensity.

3. The electronic device of claim 1, wherein the at least one processor is further configured to:

process a first user input obtained using at least one pressure sensor of the two or more pressure sensors when an intensity of a pressure of the first user input is greater than a first intensity, while the electronic device is not in the submerged state, and process a second user input obtained using at least one pressure sensor of the two or more pressure sensors when an intensity of a pressure of the second user input is greater than a second intensity, while the electronic device is in the submerged state, and wherein the second intensity is greater than the first intensity.

4. The electronic device of claim 1, further comprising:
a support disposed between the two or more pressure sensors.

5. The electronic device of claim 1, wherein the two or more pressure sensors comprise a first electrode layer, a second electrode layer parallel to the first electrode layer, and an elastic body layer disposed between the first electrode layer and the second electrode layer, and wherein an elastic body layer of a first pressure sensor among the two or more pressure sensors and an elastic body layer of a second pressure sensor among the two or more pressure sensors are spaced apart from each other by the specified distance.

6. The electronic device of claim 5, further comprising:
a first support disposed between the elastic body layer of the first pressure sensor and the elastic body layer of the second pressure sensor.

7. The electronic device of claim 1, wherein the at least one sensor comprises a liquid sensing sensor or a water pressure sensing sensor.

8. A method for controlling an electronic device in a submerged state, the method comprising:

sensing whether the electronic device is in the submerged state using at least one sensor of the electronic device or a display of the electronic device;

in response to sensing that the electronic device is not in the submerged state:

displaying, on a first region and a second region of the display, a first user interface on which icons of a plurality of applications are arranged, wherein the display comprises a touch panel and two or more pressure sensors, wherein the touch panel capable of obtaining a user touch input both the first region and the second region of the display, wherein the first region and the second region do not overlap each other, wherein the two or more pressure sensors are disposed on an upper layer or a lower layer of the second region, to sense a pressure applied to different pressure regions of the second region, and wherein the two or more pressure sensors are spaced apart from each other by a specified distance; and in response to sensing that the electronic device is in the submerged state:

deactivating the touch panel, displaying, on the first region, a second user interface changed from the first user interface, wherein the second user interface includes a pointer, sizes of icons displayed on the second user interface are the same as sizes of the icons displayed on the first user interface and a distance between the icons displayed on the second user interface is the same as a distance between the icons displayed on the first user interface, displaying, on the pressure regions of the second region, third user interfaces, receiving a user input to one pressure region of the pressure regions, and based on a function allocated to a user interface being positioned on the one pressure region of the third user interfaces, processing the user input, wherein processing the user input further comprises:
while the electronic device is sensed to be in the submerged state:
moving the pointer in a leftward direction based on a position of the user input corresponding to a first pressure sensor of the two or more pressure sensors,
moving the pointer in a rightward direction based on the position of the user input corresponding to a second pressure sensor of the two or more pressure sensors,
moving the pointer in an upward direction based on the position of the user input corresponding to a third pressure sensor of the two or more pressure sensors,
moving the pointer in a downward direction based on the position of the user input corresponding to a fourth pressure sensor of the two or more pressure sensors, and
executing an application of which an icon is indicated by the pointer based on the position of the user input corresponding to a fifth pressure sensor of the two or more pressure sensors.

* * * * *